United States Patent Office 2,895,970
Patented July 21, 1959

2,895,970

BISNORALLO-7-CHOLENALDEHYDES

Gerald D. Laubach, Jackson Heights, N.Y., assignor to Chas. Pfizer & Co., Inc., Brooklyn, N.Y., a corporation of Delaware No Drawing. Application September 24, 1954
Serial No. 458,268

1 Claim. (Cl. 260—397.5)

This invention relates to novel steroid-type compounds and their preparation. More particularly, it concerns new and useful intermediates in the synthesis of steroid hormones like cortisone. This present application is a continuation-in-part of parent application Serial No. 233,489, filed on June 25, 1951, and now abandoned.

Several of the steroid-type constituents of the adrenal cortex have been shown to be of great use in the therapy of certain diseases like rheumatoid arthritis. The volume of cortisone and other such compounds which can be prepared commercially has been severely limited by the short supply of certain naturally occurring materials, such as the bile acids, which have been the necessary starting reactants in the usual manufacturing process. It has recently been found possible to utilize other steroid-type raw materials which are more available, e.g. ergosterol.

However, one problem encountered in the course of this new kind of synthesis is cleavage of the long side chain attached to the steroid nucleus at carbon atom 17. The cortical steroids of greatest therapeutic activity usually have relatively short chains, generally only two carbons long, attached at this point. On the other hand, ergosterol and such readily obtained steroids have chains of as many as nine carbons or more. It is thus highly important to device a method for cleaving these chains or replacing them with the desired short-chain substituents.

It has been found that steroid compounds possessing a nuclear double bond at the 7,8-carbon position and a double bond at the 22,23-carbon position may be treated in such a manner as to cleave selectively the C17 side chain and leave a three carbon fragment at this position. The three carbon fragment may then be further degraded to a fragment of the same two carbon chain length as occurs in the especially valuable cortisone and related adrenal cortex hormones.

The process of this invention, whereby splitting and degradation of the C17 side chain of a 7,8-unsaturated steroid is accomplished selectively at the 22-carbon atom, broadly comprises treating the steroid with ozone and reductively cleaving the ozonide thus formed to obtain the corresponding aldehyde. The yield of product from this reaction is good despite the instability of some aldehydes. There may be a minor amount of further oxidation of the side chain or slight cleavage of the steroid nucleus, but not to a degree which materially interferes with the efficiency of the process. The products recovered are steroids having a three-carbon aldehydic substituent at the C17 position, i.e. compounds of the general structure:

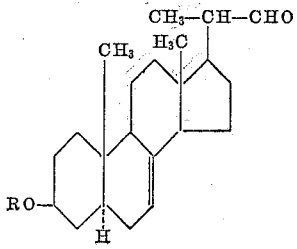

wherein R is a member of the group hydrogen, alkyl and acyl. A variety of alkyl groups, e.g. methyl, ethyl and benzyl are useful. The same is true for the acyl group, which has been acetyl, propionyl, butyryl and benzoyl. These changes in the group at the 3 position have no effect on the overall reaction. In this formula, and in all others in this application, the dotted line H at the 5 position is used in the conventional sense, i.e. to show the allo configuration.

To degrade this side chain still further, as is preferred in synthesizing cortisone and the like, the aldehyde is then converted into an acylated enol or enol ester type of structure, i.e. of the formula:

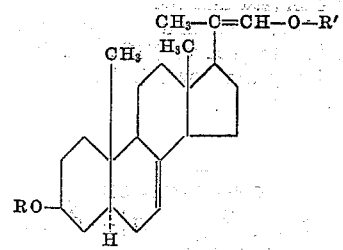

wherein R is chosen from the group hydrogen, alkyl and acyl and R' is acyl. This acyl group has been any of a wide variety, changes here making no difference in the overall reaction. The useful groups include, for example, acetyl, propionyl, butyryl and benzoyl. This in turn is oxidized to the corresponding ketone. Steroids having the particularly desired two-carbon side chain at the C17 position are thus obtained:

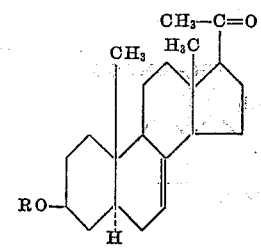

wherein R is chosen from the group hydrogen, alkyl and acyl. These compounds are especially valuable for conversion to biologically active cortisone, Compound F and like cortical hormones.

Rather than degrading the three carbon fragment at the 17-positions of these steroid compounds to a two carbon fragment, compounds having a three carbon carboxylic acid group may be prepared:

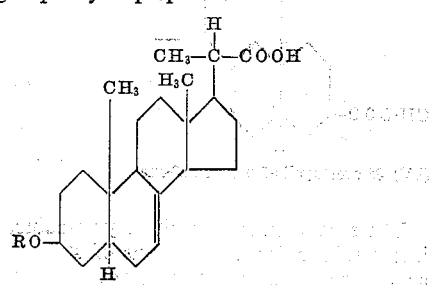

wherein R is chosen from the group hydrogen, alkyl and acyl. This group of compounds is valuable for use in synthesizing biologically active steroids since the 17-side chain is very stable and various operations, such as introduction of oxygen at the 11-carbon atom of the nucleus, may be carried out before converting the side chain to a two carbon group. Esters of the carboxylic acids may be prepared from the acids and these are also of use as intermediates for active steroids. Although the 7,8-unsaturated steroids bearing a 22-23-unsaturated alkenyl side chain at the 17-position may be oxidized (e.g. with ozone) directly to a carboxylic acid of the type described above, there is a tendency during this reaction to attack the nuclear double bond. I prefer to form the aldehyde and then oxidize the aldehyde by means of a mild oxidizing agent to the acid. Ozone may be used for the latter reaction but the quantity must be controlled. The acids may be converted to the corresponding esters by conventional methods. Although the steroid acid having a free hydroxyl group at the 3-position may be prepared, it may be preferred to retain an alkyl or acyl group attached to the oxygen at this position to prevent oxidation here.

The reactions of this invention may be summarized by the following diagram in which 5-dihydroergosteryl acetate (I) is used as an example of suitable starting material. (I) is ozonized and reduced with cleavage to obtain (II); this is enolized and esterified, e.g. treated with acetic anhydride, to product (III); and (III) is oxidized in any desired way to recover (IV). (II) is oxidized to the acid (V).

terials for these reactions are the 7,8-mono-unsaturated steroids having the general structure:

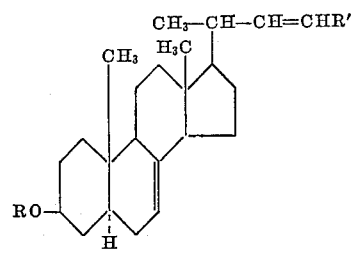

wherein R is chosen from the group hydrogen, alkyl and acyl and R' is alkyl. Dihydroergosterol, its ethers and esters are especially preferred, but also valuable are compounds having the same type of nucleus with variations in the C17 side chain beyond 23-carbon atom. Examples of these are α-spinasterol, its ethers and esters, and chondrillasterol (7,8; 22,23 poriferastadienel), its ethers and

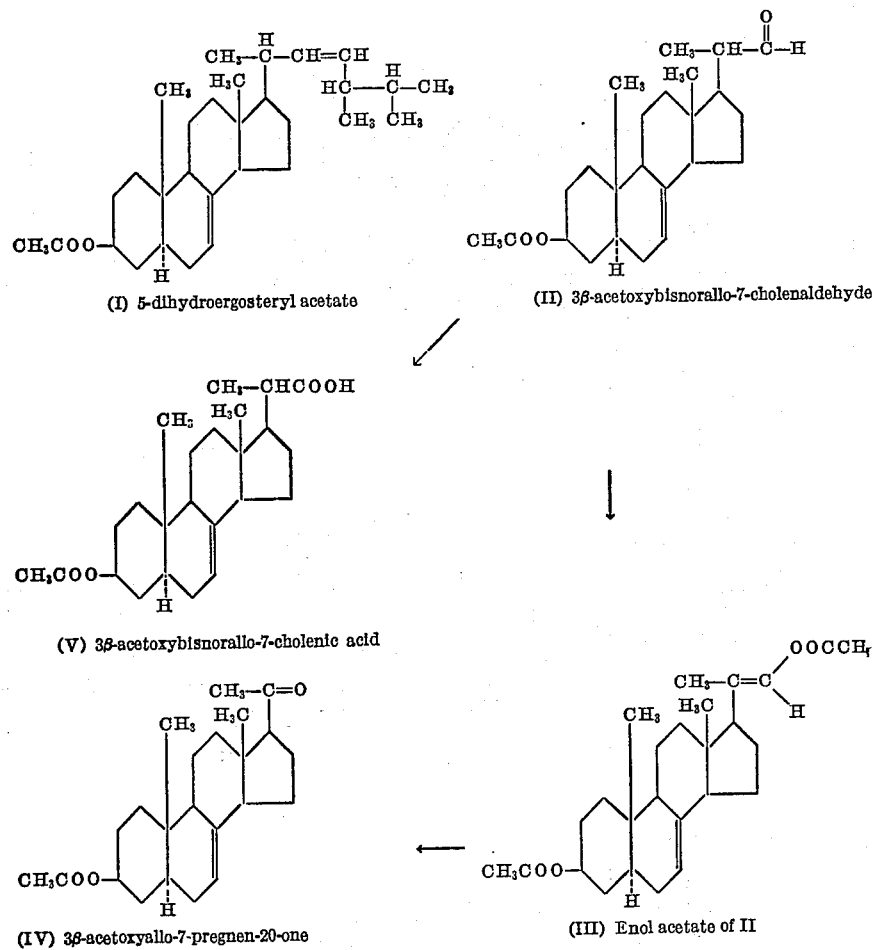

(I) 5-dihydroergosteryl acetate (II) 3β-acetoxybisnorallo-7-cholenaldehyde (V) 3β-acetoxybisnorallo-7-cholenic acid (IV) 3β-acetoxyallo-7-pregnen-20-one (III) Enol acetate of II These compounds are all very valuable, particularly as intermediates for the synthesis of steroid hormones such as cortisone. For example, the Compound IV above, 3β-acetoxyallo-7-pregnen-20-one, is selectively dehydrogenated to introduce a 9(11) double bond, according to the method of my copending application, Serial No. 458,269, filed simultaneously herewith, and now abandoned. This product is then converted by the method of Stork et al., J.A.C.S., vol. 73, p. 3546 (1951), to 3β-ol-allopregnane-11, 20-dione-3-acetate, which in turn is converted to cortisone by the method of Chemerda et al., J.A.C.S., vol. 73, p. 4052 (1951).

Compounds that are particularly useful as starting maesters. (The latter substance is a $C_{24}$ epimer of α-spinasterol.) Typical formulas are given below:

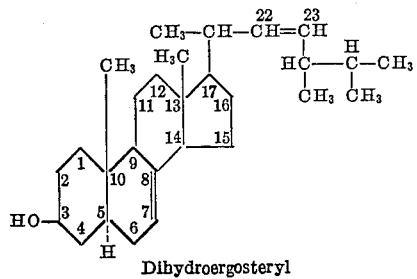

Dihydroergosteryl

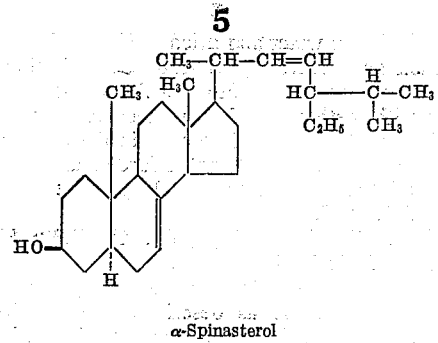

α-Spinasterol

One may readily use esters of such sterols, e.g. the acetate as previously noted, the propionate or the benzoate. Alternatively the methyl, ethyl or other ethers may be employed. It is generally advisable to protect the 3-hydroxy group of the sterol by formation of an ester or ether, in order to prevent oxidation at this point of the nucleus. It is a peculiar fact that the nuclear double bond at the 7,8 position is not at all affected by the oxidation. A 5,6-unsaturation, for instance, will generally necessitate the addition of bromine or a similar protective agent to the reaction mass, but ozone does not alter the nuclear structure of a 7,8 mono-unsaturated steroid. This is the main reason why the latter type of compound is preferred for use in this invention.

In selectively oxidizing the $C_{22}$, $C_{23}$ double bonds with ozone, it is preferable to dissolve the steroid in a solvent which is relatively inert to the ozonization, such as, for instance, chloroform or methylene chloride. Since there is some slight tendency for formation of hydrochloric acid in these solvents, and since the product yield seems to be somewhat improved thereby, it is also generally better to include in the reaction mixture a tertiary organic base like pyridine, quinoline, or triethylamine. The reaction may be run at very low temperatures, such as —80° C., but to obtain a reasonable rate of reaction it is preferred to operate at about 0° C. Higher temperatures may be used, but there is a tendency for decomposition of the reactants and product.

Ozone may be produced by any of the various apparatus designed for this purpose, many of which are available in laboratory or industrial size models. It is most satisfactory to introduce this oxidizing agent to the reaction mixture at a fairly rapid rate, applying cooling means of any desired type to prevent appreciable temperature rise, and to continue the ozone addition until approximately 1.5 to 1.9 moles of the reagent have been absorbed per mole of steroid. Although ozonide product can be isolated from reaction mixtures in which more ozone has been used, side-reactions may occur which result in a decreased yield. On the other hand, if an appreciably lower proportion than 1.5 moles of ozone per mole of starting material is used, then some steroid will be left unreacted. Using a standard laboratory ozonizer which produces about one millimole of ozone per liter of gaseous oxygen per minute, and starting with a pressure of 8 pounds per square inch of oxygen passing through the apparatus at the rate of one liter per minute with 80 volts of electricity applied, the average laboratory run of this reaction may be accomplished in one to three hours. The ozone-enriched oxygen is generally passed through a sintered glass disc under the surface of the reaction mixture, which is agitated by conventional means.

After ozonization has been completed, the product is preferably recovered by concentration of the reaction mixture in vacuum under nitrogen. Generally the temperature is kept below about 40° C. to prevent decomposition, although the material has considerable stability. The ozonide thus obtained is then ready for cleavage and reduction to form the desired aldehyde. According to one specific embodiment of the invention, the ozonide is dissolved in a mixture of acetic acid and an inert solvent, such as ether, and the solution is cooled to about 0° C. While a stream of nitrogen is passed through the mixture, zinc dust is added to effect the decomposition. After this reacton has been completed, e.g. when peroxide tests are negative, further solvent is added and the solution is washed with dilute sodium bicarbonate and then with water. The water is removed and the dried solvent solution concentrated to yield a partially crystalline aldehydic product. This may be purified if desired, for example by triturating with a lower alcohol, preferably methanol, at room or slightly higher temperature. Any unreacted starting material is not thereby dissolved. The alcohol extract of the aldehyde may then be concentrated. Alternatively, the product may be further purified by forming the sodium bisulfite adduct of the aldehyde. Isolation of this material as a solid and reconversion to the aldehyde gives a product of quite high purity. It is naturally possible to use other methods for converting the ozonide to the corresponding aldehyde, instead of this zinc dust-acid reaction. For instance, catalytic reduction methods may be employed. Various possible conditions for such reactions will be obvious to those skilled in the art.

Esters of the enolized form of the aldehydes thus produced are advantageously prepared by treating the aldehyde with a suitable acylating compound. For instance, referring to the reaction series hereinbefore described, the 3β-acetoxybisnoralla-7-cholenaldehyde (II) may be heated with acetic anhydride containing fused sodium acetate to produce an excellent yield of the corresponding enol acetate (III). The enol ester is finally oxidized to the corresponding two-carbon chain ketone, e.g. (IV) in the aforesaid 5-dihydroergosteryl acetate series. Substantially any oxidizing agent generally useful for such a reaction may be employed. However, ozone is particularly suitable for converting the enol ester to the ketone in good yield. When this stage of the synthesis has been reached, there is now available a two-carbon chain at the 17-position of the steroid nucleus. Since this is the same type of C17 substituent as found in the biologically active cortisone, Compound F and the like, it is apparent that these product ketones serve as excellent intermediates for the preparation of such cortical hormones. Ketals prepared by a conventional reaction from the ketones are also of use as intermediates.

The oxidation of the steroid aldehydes to the corresponding acid may be carried out with the use of various oxidizing agents generally useful for such a reaction. It has been found that chromic acid in strong sulfuric acid solution or in a solution containing, in addition to sulfuric acid, water-miscible, organic solvents which are stable under the conditions of the reaction, is particularly useful. Solvents such as acetic acid or acetone are quite useful for this purpose. Furthermore, the reaction may be run in the presence of a water-immiscible solvent, such as ether, in which the aldehyde is dissolved. In this case, the reaction occurs in a two-phase system and strong agitation is advisable. For instance, by means of this reagent (chromic acid), 3β-acetoxybisnorallo-7-cholenaldehyde (II) has been converted to the corresponding acid (V). It is advisable to run the reaction at a low temperature, preferably not over about 5° C., for a short time, at the most several hours. In general, the reaction may be followed by observing the change in color which occurs during the oxidation. Prolonging the time or raising the temperature may tend to induce side reactions. This acid, and compounds with the same nuclear structure and side chain but varying in the nature of the group substituted at the 3-position (other esters, ethers, etc.), have a definite advantage in that they may be carried through various reactions involving the steroid nucleus and display considerable stability. After such reactions are completed, the 3-carbon side chain may then be degraded to the usual 2-carbon side chain of biologically active compounds, such as cortisone. Rather than using the acid, an ester, such as the methyl ester, may be utilized in carrying out such further reactions.

The following examples are given by way of illustration and are not to be considered as the sole embodiments of this invention, protection of which is only to be limited by the specific wording of the appended claims.

EXAMPLE I

*3β-acetoxybisnorallo-7-cholenaldehyde*

An ice cold solution of 5-dihydroergosteryl acetate (0.05 mole, melting point 176–182° C.) in 1250 ml. of chloroform and 25 ml. of pyridine was ozonized for 85 minutes (0.085 mole of ozone circulated at the rate of 0.001 mole/liter/minute at 1 liter/minute). When ozonization was completed, nitrogen was blown through the cold solution, which was then concentrated under vacuum in a stream of nitrogen at a temperature not exceeding 30–40° C.

The oily residue was dissolved in 125 ml. of acetic acid and 250 ml. of ether. Zinc dust (20 grams) was added while the solution was held at 0° C. and agitated by a swirling motion. After 10 minutes of mixing, 1000 ml. of ether were added and the suspension was filtered. The filtrate was extracted with water and then saturated bicarbonate solution, and finally washed with water until neutral. The ether layer was dried over anhydrous sodium sulfate and concentrated at reduced pressure. A tan magma resulted, which on trituration with three 50-ml. portions of methanol yielded 3.91 grams (18%) of unreacted starting material of excellent purity, melting point 164–177° C.

The methanolic filtrate was poured as a thin stream into 400 ml. of 30% sodium bisulfite solution to afford an immediate curdy precipitate. After 30 minutes the solid was filtered off, washed with 50 ml. of ice water, broken up under 50 ml. of ether, refiltered and washed with ether. When dried overnight in a desiccator, this bisulfite adduct was treated under nitrogen with 1800 ml. of ether and 720 ml. of 10% sodium carbonate solution. The ether layer was separated after standing four hours and the remaining bisulfite compound further treated with 25 grams of sodium carbonate in water and 1000 ml. of ether until all of the solid had disappeared. The combined ether layers, when water washed and dried, gave 71.2 grams (47% yield) of the crystalline aldehyde, melting point 125–130° C.

A portion of this aldehyde (0.100 gram) was converted to the semicarbazone by treatment with 0.200 gram each of semicarbazide hydrochloride and sodium acetate in a refluxing methanol-water mixture. An immediate precipitate of 0.086 gram (75%) of the semicarbazone was obtained, melting point 220–224° C. One recrystallization gave an analytical sample, melting at 228.8° C. with decomposition.

*Analysis.*—Calcd. for $C_{25}H_{39}O_3N_3$: C, 69.90; H, 9.15; N, 9.78. Found: C, 69.93; H, 8.83; N, 9.71.

In a manner analogous to the above, this reaction was carried out using a variety of substituents at the 3 position instead of the acetoxy group described above. These changes had no effect on the overall reaction. The used groups included, for example, esters of propionic, butyric and benzoic acids, and the methyl, ethyl and benzoyl ethers. The reaction also went when the 3 position contained the free hydroxyl group.

EXAMPLE II

*Enol acetate of 3β-acetoxybisnorallo-7-cholenaldehyde*

A mixture of 1.86 grams (0.005 mole) of the aldehyde prepared in Example I and 1.0 gram of fused sodium acetate in 50 ml. of acetic anhydride was heated at reflux under nitrogen for 12 hours. After cooling overnight, the crystallized solid was separated by filtration, washed with water and dried. The product weighed 1.23 grams and melted at 152–158° C. Additional solid was recovered by concentration of the mother liquor and dilution with methanol. This weighed 0.15 gram (melting point 146–155° C.) The combined yield was 71%. Recrystallization from ethanol afforded an analytically pure sample of the enol ester as large platelets, melting point 156–159° C.

*Analysis.*—Calcd. for $C_{26}H_{38}O_4$: C, 75.32; H, 9.24. Found: C, 75.23; H, 9.04.

By analogous methods, using acylating agents other than acetic anhydride as described above, other enol esters were prepared from the aldehyde. These included, for example, the propionate, butyrate and benzoate.

EXAMPLE III

*3β-acetoxyallo-7-pregnen-20-one*

A solution of 1.24 grams (0.003 mole) of the enol acetate from Example II in 35 ml. of ice cold chloroform was ozonized for 3½ minutes (0.0035 mole of ozone, rate 0.001 mole/liter/minute at 1 liter/minute). Nitrogen was blown through the solution, which was then concentrated in vacuo under nitrogen. The residue was dissolved in 20 ml. of ether and 10 ml. of acetic acid and treated with 1.0 gram of zinc dust under nitrogen for 30 minutes. The reaction mixture was diluted with 100 ml. of ether, filtered, and extracted with water, saturated sodium carbonate solution, then with water to neutrality. The solution was dried over anhydrous sodium sulfate and concentrated to produce a crystalline, colorless solid, which on recrystallization from methanol gave 0.760 gram (71% yield) of the desired ketone, melting point 127–145° C.

A highly purified sample was obtained from 1:4 and 2:3 benzene-petroleum ether eluates by chromatography of the ketone over alumina, followed by recrystallization from methanol. This product had the melting point 164–166° C. and the optical rotation $[\alpha]_D$ +51° (c., 0.95 in chloroform). The infrared spectrum showed a strong ketonic carbonyl band at 5.85 mµ.

*Analysis.*—Calcd. for $C_{25}H_{34}O_3$: C, 77.06; H, 9.56. Found: C, 77.39; H, 9.54.

A semicarbazone was prepared by treating 0.100 gram of the non-chromatographed ketone with 0.200 gram each of semicarbazide hydrochloride and sodium acetate in a methanol-water mixture. The yield of crude product, melting at 237° C. with decomposition, was 0.100 gram (86%). Recrystallization from a chloroform-toluene mixture afforded an analytical sample, melting at 268.8° C. with decomposition.

*Analysis.*—Calcd. for $C_{24}H_{37}O_3N_3$: C, 69.36; H, 8.98; N, 10.11. Found: C, 69.26; H, 8.66; N, 10.03.

EXAMPLE IV

*3β-acetoxybisnorallo-7-cholenic acid*

A solution of 0.373 gram (0.001 mole) of 3β-acetoxybisnorallo-7-cholenaldehyde in 10 ml. of ether and 5 ml. of acetone was treated with a solution of 0.0005 mole (0.150 gram) of sodium dichromate dihydrate in 20% sulfuric acid. The mixture was stirred at 0° for two hours, at which time complete utilization of the oxidant had occurred. The green acid solution was extracted with ether and the combined solvent layers washed with water. Addition of 5 ml. of 5% sodium hydroxide solution afforded a voluminous precipitate of insoluble sodium salt. The basic layer was extracted three times with 10-milliliter portions of ether, then acidified under 10 ml. of ether with 2 N sulfuric acid. The ether layer was washed with water, shaken with sodium sulfate, and finally concentrated under vacuum to afford a 50% yield of nearly pure acid, melting point 175–185° C.

What is claimed is:
A steroid compound having the structure
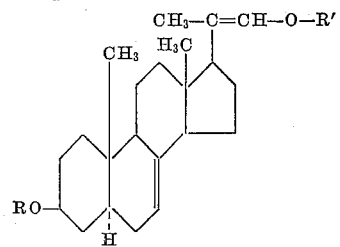
wherein R is chosen from the group consisting of hydrogen and hydrocarbon acyl containing up to 7 carbon atoms and R' is hydrocarbon acyl containing up to 7 carbon atoms.
References Cited in the file of this patent
UNITED STATES PATENTS
| | | |
|---|---|---|
| 2,623,052 | Heyl et al. | Dec. 23, 1952 |
| 2,780,621 | Reinhold | Feb. 5, 1957 |
OTHER REFERENCES
Bergman et al.: J. Org. Chem. 13, pages 10–20 (1948).